(12) United States Patent
Irie

(10) Patent No.: US 12,066,343 B2
(45) Date of Patent: Aug. 20, 2024

(54) STRESS PROPERTIES MEASUREMENT METHOD, DEVICE, AND SYSTEM CORRELATED BASED ON STRESS GRADIENTS ON MULTIPLE REGIONS

(71) Applicant: Panasonic Intellectual Property Management Co., Ltd., Osaka (JP)

(72) Inventor: Yousuke Irie, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 311 days.

(21) Appl. No.: 17/467,836

(22) Filed: Sep. 7, 2021

(65) Prior Publication Data

US 2021/0404894 A1 Dec. 30, 2021

Related U.S. Application Data

(63) Continuation of application No. PCT/JP2019/048746, filed on Dec. 12, 2019.

(30) Foreign Application Priority Data

Mar. 8, 2019 (JP) ................. 2019-042704

(51) Int. Cl.
*G01L 1/24* (2006.01)
*G01J 5/00* (2022.01)
(Continued)

(52) U.S. Cl.
CPC ............ *G01L 1/248* (2013.01); *G01J 5/0003* (2013.01); *G01J 2005/0077* (2013.01);
(Continued)

(58) Field of Classification Search
CPC .... G01L 1/248; G01L 5/24; G01J 2005/0077; G06T 2207/10048; G06T 2207/30236; G01M 5/0041; G01M 99/002
See application file for complete search history.

(56) References Cited

U.S. PATENT DOCUMENTS 9,519,844 B1 12/2016 Thompson et al.
2018/0348064 A1* 12/2018 Irie ................... G01M 99/002
(Continued)

FOREIGN PATENT DOCUMENTS

EP 3546919 A1 10/2019
JP 2016-197080 A 11/2016
(Continued)

OTHER PUBLICATIONS

International Search Report and Witten Opinion issued in International Patent Application No. PCT/JP2019/048746, dated Mar. 10, 2020; with partial English translation.
(Continued)

*Primary Examiner* — Eric S. McCall
*Assistant Examiner* — Timothy P Graves
(74) *Attorney, Agent, or Firm* — Rimon P.C.

(57) ABSTRACT

A stress properties measurement method for measuring properties of stresses generated in a structure includes acquiring, from a first imaging device, a plurality of thermal images corresponding to temperatures of a surface of the structure, the plurality of thermal images being different in imaging time from each other, generating a stress distribution image corresponding to each of the plurality of thermal images, acquiring a stress value of a first section that is smaller in stress gradient than a predetermined value and respective stress values of a plurality of second sections where stresses are concentrated for the stress distribution images, and deriving correlation properties of stresses at a
(Continued)

section of the structure based on the stress value of the first section acquired and the respective stress values of the plurality of second sections acquired.

7 Claims, 11 Drawing Sheets

(51) Int. Cl.
 *G06T 7/20* (2017.01)
 *H04N 5/33* (2023.01)
(52) U.S. Cl.
 CPC ...... *G06T 7/20* (2013.01); *G06T 2207/10048* (2013.01); *G06T 2207/30236* (2013.01); *H04N 5/33* (2013.01)

(56) References Cited

U.S. PATENT DOCUMENTS

2019/0310174 A1 10/2019 Irie et al.
2020/0056880 A1* 2/2020 Wang ................... G01B 11/254

FOREIGN PATENT DOCUMENTS

| WO | 2017/141294 A1 | 8/2017 | |
| WO | WO-2017141294 A1 * | 8/2017 | .............. G01K 5/56 |
| WO | 2018/123129 A1 | 7/2018 | |

OTHER PUBLICATIONS

The Extended European Search Report dated Mar. 18, 2022 for the related European Patent Application No. 19918586.9.

* cited by examiner

NOT-IN-SERVICE TRAIN (ONE TRAIN SET)
PASSES THROUGH PLATFORM

CPG1

DOWN EXPRESS TRAIN (ONE TRAIN SET)
PASSES THROUGH PLATFORM

CPG2

DOWN LIMITED EXPRESS TRAIN (ONE TRAIN SET) PASSES THROUGH PLATFORM

UP AND DOWN EXPRESS TRAINS (TWO TRAIN SETS) PASS THROUGH PLATFORM

STRESS PROPERTIES MEASUREMENT METHOD, DEVICE, AND SYSTEM CORRELATED BASED ON STRESS GRADIENTS ON MULTIPLE REGIONS

CROSS-REFERENCE OF RELATED APPLICATIONS

This application is a Continuation of International Patent Application No. PCT/JP2019/048746, filed on Dec. 12, 2019, which in turn claims the benefit of Japanese Application No. 2019-042704, filed on Mar. 8, 2019, the entire disclosures of which Applications are incorporated by reference herein.

BACKGROUND

1. Technical Field

The present disclosure relates to a stress properties measurement method, a stress properties measurement device, and a stress properties measurement system.

2. Description of the Related Art

Patent Literature (PTL) 1 discloses a method for measuring a distribution of stresses generated in a structure including two supports and a beam provided between the two supports, the stresses being generated when a mobile object travels on the structure. This method includes capturing, by a first imager, an image of the mobile object or capturing, by the mobile object, an image of an identification mark attached to the structure to generate first image data, obtaining, based on the first image data, a travel period during which the mobile object travels between the supports of the structure, capturing, by a second imager, an image of a surface of the beam of the structure to generate second image data, obtaining an amount of change in temperature based on a group of pieces of the second image data corresponding to the travel period in thermal image data, and computing an amount of change in stress based on the amount of change in temperature to obtain a stress distribution based on the amount of change in stress.

PTL 1 is WO 2017/141294 A.

SUMMARY

The present disclosure provides a stress properties measurement method, a stress properties measurement device, and a stress properties measurement system, each of which being intended to measure, with high accuracy and convenience, stress properties for use in comparing stresses generated at each portion of a structure in an actual field environment where the structure is disposed.

The present disclosure provides a stress properties measurement method for measuring properties of stresses generated in a structure, the stress properties measurement method including acquiring, from a first imaging device, a plurality of thermal images corresponding to temperatures of a surface of the structure, the plurality of thermal images being different in imaging time from each other, generating a stress distribution image corresponding to each of the plurality of thermal images, acquiring a stress value of a first section that is smaller in stress gradient than a predetermined value and respective stress values of a plurality of second sections where stresses are concentrated for the stress distribution images, and deriving correlation properties of stresses at a section of the structure based on the stress value of the first section acquired and the respective stress values of the plurality of second sections acquired.

The present disclosure further provides a stress properties measurement device that measures properties of stresses generated in a structure, the stress properties measurement device including a communication unit that acquires, from a first imaging device, a plurality of thermal images corresponding to temperatures of a surface of the structure, the plurality of thermal images being different in imaging time from each other, a generator that generates a stress distribution image corresponding to each of the plurality of thermal images, a selector that acquires a stress value of a first section that is smaller in stress gradient than a predetermined value and respective stress values of a plurality of second sections where stresses are concentrated for the stress distribution images, and a computing unit that derives correlation properties of stresses at a section of the structure based on the stress value of the first section acquired and the respective stress values of the plurality of second sections acquired.

The present disclosure further provides a stress properties measurement system including a stress properties measurement device that measures properties of stresses generated in a structure, and a first imaging device. The stress properties measurement device acquires, from the first imaging device, a plurality of thermal images corresponding to temperatures of a surface of the structure, the plurality of thermal images being different in imaging time from each other, generates a stress distribution image corresponding to each of the plurality of thermal images, acquires a stress value of a first section that is smaller in stress gradient than a predetermined value and respective stress values of a plurality of second sections where stresses are concentrated for the stress distribution images, and derives correlation properties of stresses at a section of the structure based on the stress value of the first section acquired and the respective stress values of the plurality of second sections acquired.

According to the present disclosure, it is possible to measure, with high accuracy and convenience, stress properties for use in comparing stresses generated at each portion of a structure in an actual field environment where the structure is disposed.

DETAILED DESCRIPTION (Background Leading to the Present Disclosure)

Figure 13:
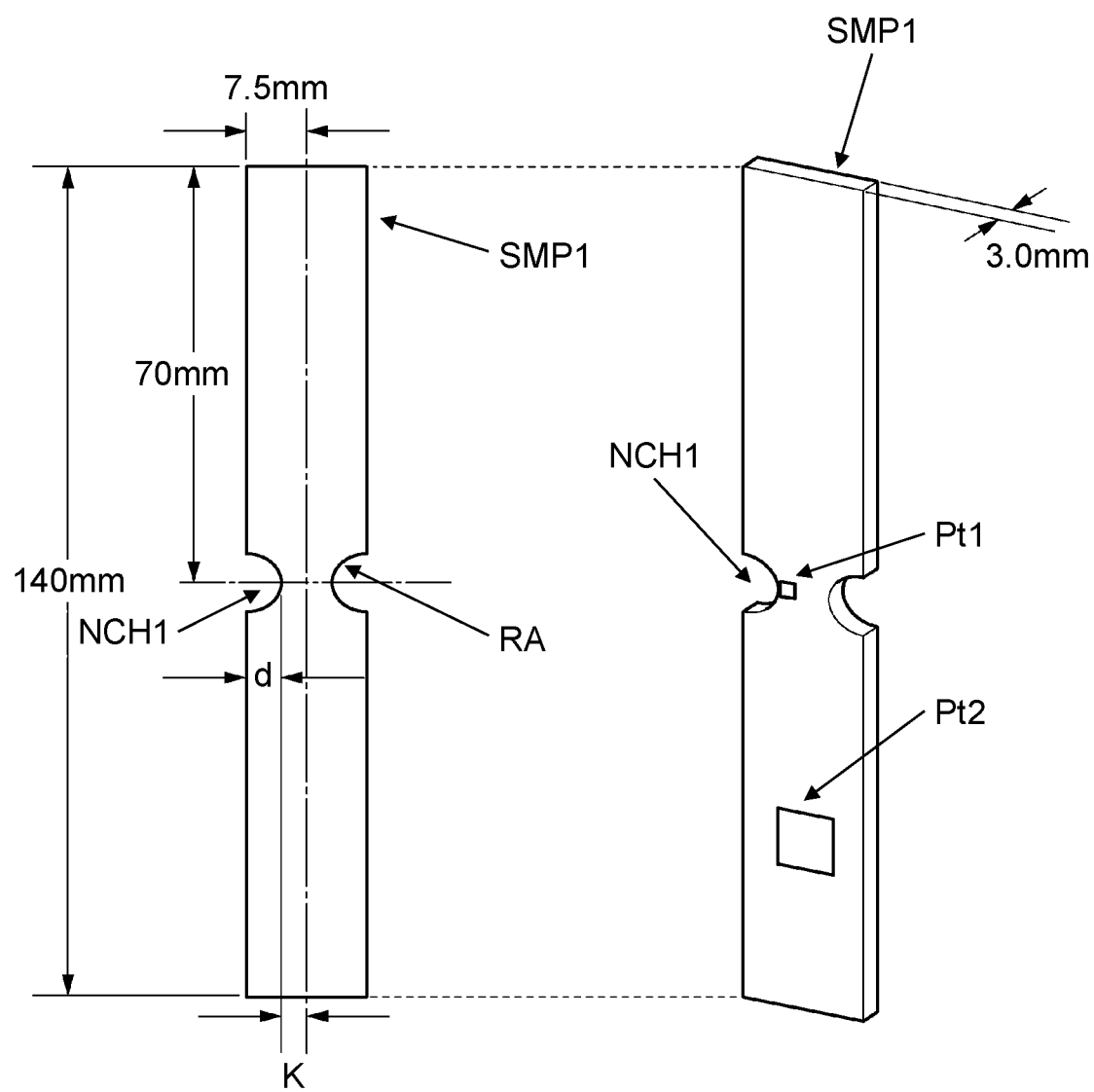
FIG. 13 is a scene diagram showing, in plan view and perspective view, an appearance of a test piece in the related art for use in stress measurement.

FIG. 13 is a scene diagram showing, in plan view and perspective view, an appearance of test piece SMP1 in the related art for use in stress measurement. It is assumed that, as a structure that receives a load, a rectangular parallelepiped member (having a length of 140 mm (=70 mm×2), a width of 15 mm (=7.5 mm×2), and a thickness of 3 mm, for example) like test piece SMP1 is used, the rectangular parallelepiped member having notch NCH1 provided at a center of each long side, in a width direction. Note that the dimensions shown in FIG. 13 are merely examples, and the present disclosure is not limited to the dimensions.

In a stress distribution when a load is applied to such test piece SMP1, largest stresses are applied to section Pt1 of notch NCH1, and average stresses are applied to section Pt2 located at about the midpoint between notch NCH1 and an end of the long sides. This is because, as in test piece SMP1, stresses locally increase (that is, stresses are concentrated) around a section of the structure where a cross-sectional shape of a hole or a notch changes. A degree of stress concentration changes in a manner that depends on the cross-sectional shape, and the more remarkable the change in the cross-sectional shape, the larger the stresses tend to be. In FIG. 13, RA denotes a radius of curvature of a bottom of notch NCH1, d denotes a depth of notch NCH1, and K denotes a length that is half a width of a minimum cross section.

On the other hand, in a field environment where a general structure that has no peculiar shape such as the above-described notch is actually disposed, a section where stresses are concentrated by each type of vibrations having different magnitudes based on various surrounding occurrence factors can be visually presumed from the shape and the like. However, when each of the vibrations having different magnitudes occur, it is difficult to determine how large stress is applied to the structure by comparison between portions. In other words, even when each of the vibrations having different magnitudes occur, it is not possible to compare stress properties of each portion in the structure, such as portions where stresses tend to be concentrated and portions where stresses are less prone to be concentrated, and thus an objective indicator for use in determining which portion in the structure is subject to stresses more than other portions cannot be obtained.

Note that, in PTL 1, a stress distribution is obtained based on thermal image data that is measured when a test vehicle having a known vehicle weight travels in a predetermined measurement section of a road on a bridge (for example, a section between two adjacent piers of the road on the bridge), and a stress value generated by the previous test vehicle is compared with a calculated design value. However, such measurement needs to be made during a time period such as midnight during which a number of traveling vehicles is small, making the measurement less convenient.

In the following exemplary embodiment, a description will be given of examples of a stress properties measurement method, a stress properties measurement device, and a stress properties measurement system, each of which being intended to measure, with high accuracy and convenience, stress properties for use in comparing stresses generated at each portion of a structure in an actual field environment where the structure is disposed.

A description will be given below of details of the exemplary embodiment in which configurations and effects of the stress properties measurement method, the stress properties measurement device, and the stress properties measurement system according to the present disclosure are specifically disclosed with reference to the drawings as appropriate. It is noted that a more detailed description than need may be omitted. For example, a detailed description of a well-known matter and a redundant description on substantially the same configuration may be omitted. This is to avoid an unnecessarily redundant description below and to facilitate understanding of those skilled in the art. Note that the attached drawings and the following description are provided for those skilled in the art to fully understand the present disclosure, and are not intended to limit the subject matter as described in the appended claims.

Hereinafter, under the stress properties measurement method according to the first exemplary embodiment, the following processes (steps) are executed. Specifically, under the stress properties measurement method, properties of stresses generated in a structure (for example, a support fitting of a private speaker fixed to a ceiling of a platform of a station) are measured. Under the stress properties measurement method, a plurality of thermal images different in imaging time from each other are acquired from an infrared camera (an example of a first imaging device), the plurality of thermal images corresponding to temperatures of a surface of the structure, and a stress distribution image corresponding to each of the plurality of thermal images is generated. Further, under the stress properties measurement method, for the stress distribution image, a stress value of a first section that is smaller in stress gradient than a predetermined value and respective stress values of a plurality of second sections where stresses are concentrated are acquired, and correlation properties of stresses at a section of the structure are derived from the stress value of the first section and the respective stress values of the plurality of second sections thus acquired.

As described above, in the following description, the support fitting (see FIG. 1) of the private speaker fixed to the ceiling of the platform of the station is given as an example of the structure, but the structure is not limited to such a support fitting (see below).

<Example of Disposition of Structure to be Measured>

Figure 1:
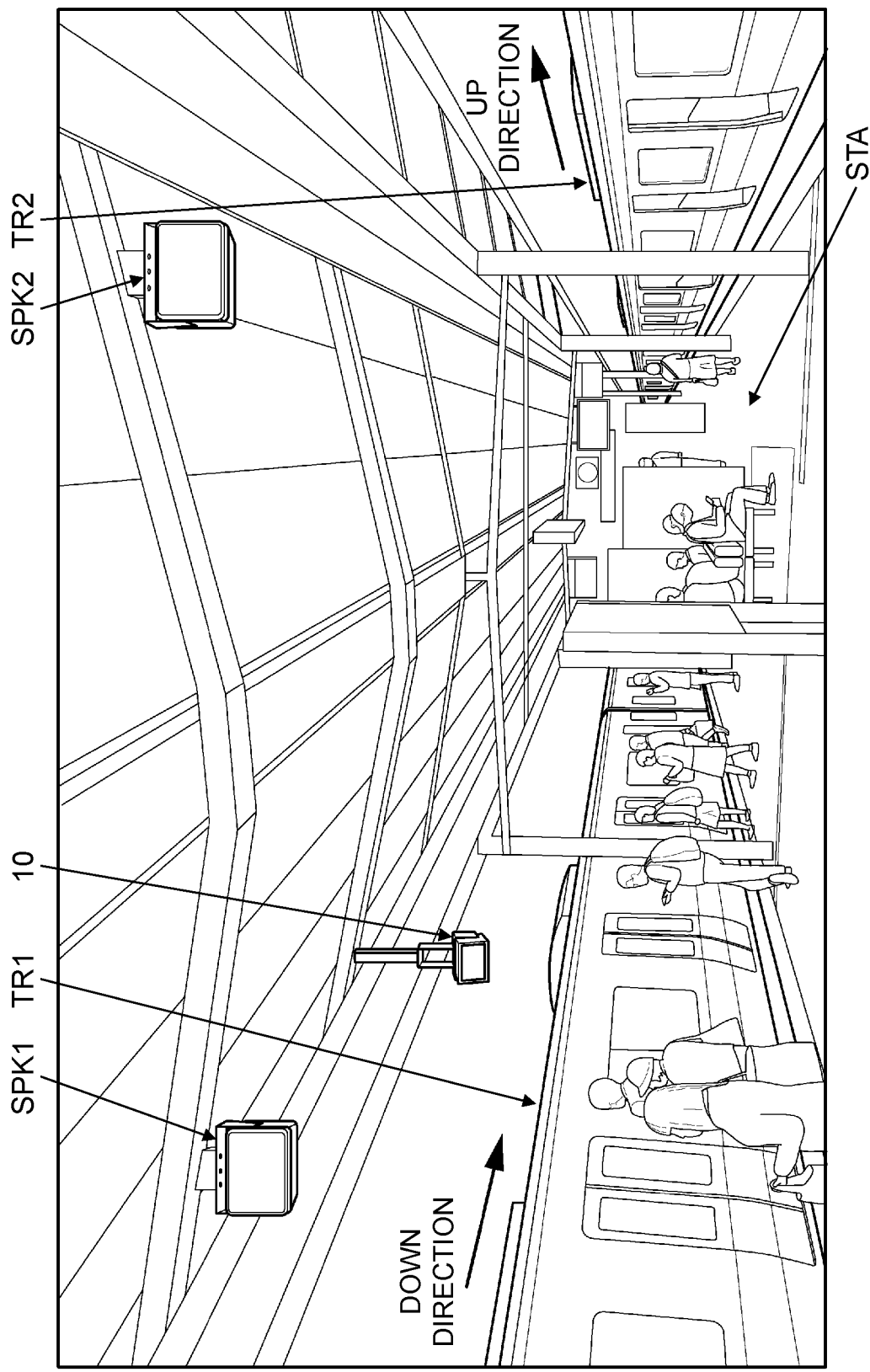
FIG. 1 is a scene diagram showing an example of how a plurality of private speakers are arranged on a platform of a station.
Figure 2:
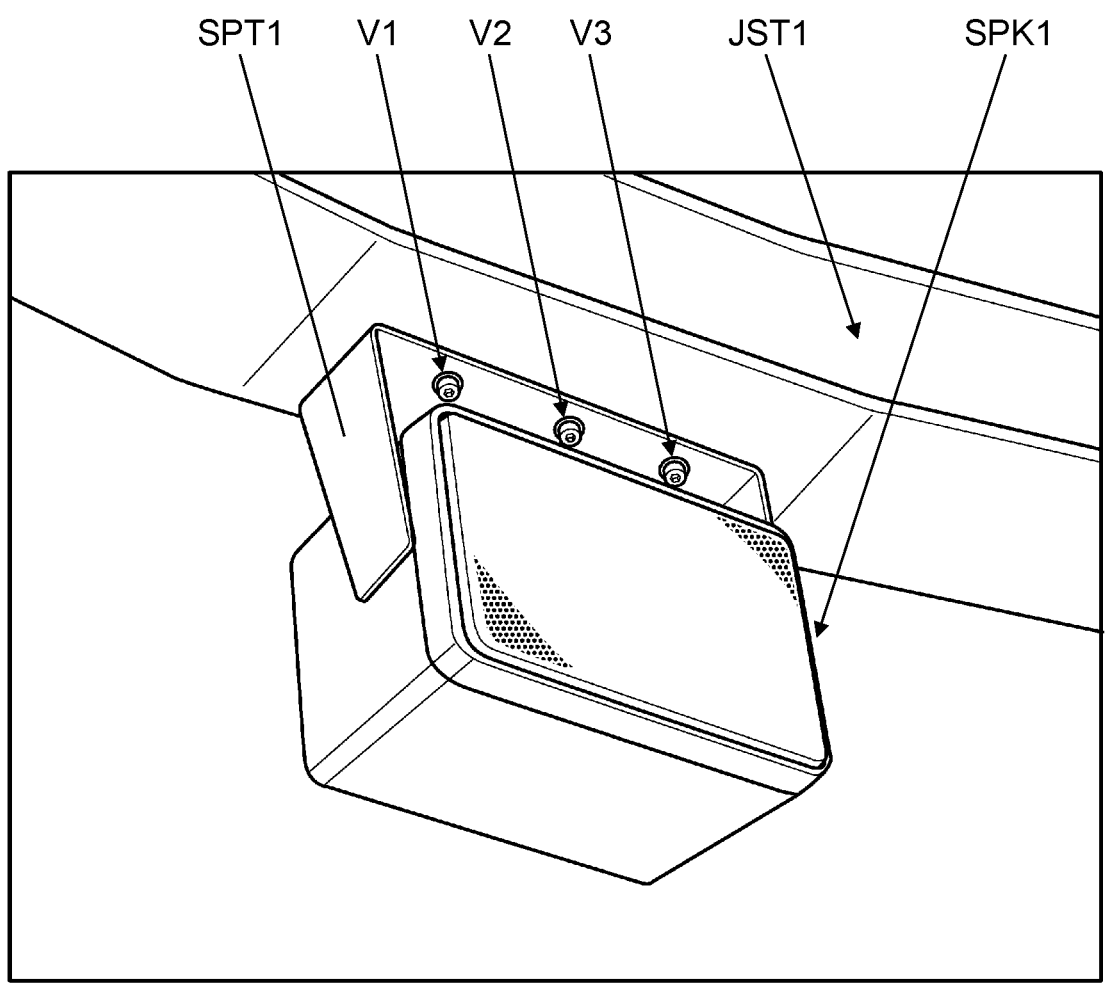
FIG. 2 is an enlarged view of a main part showing an example of how each private speaker is fixed to a beam of a ceiling via a support fitting.

FIG. 1 is a scene diagram showing an example of how a plurality of private speakers SPK1, SPK2 are arranged on a platform of station STA. FIG. 2 is an enlarged view of a main part showing an example of how private speaker SPK1 is fixed to beam JST1 of a ceiling via support fitting SPT1

Figure 3:
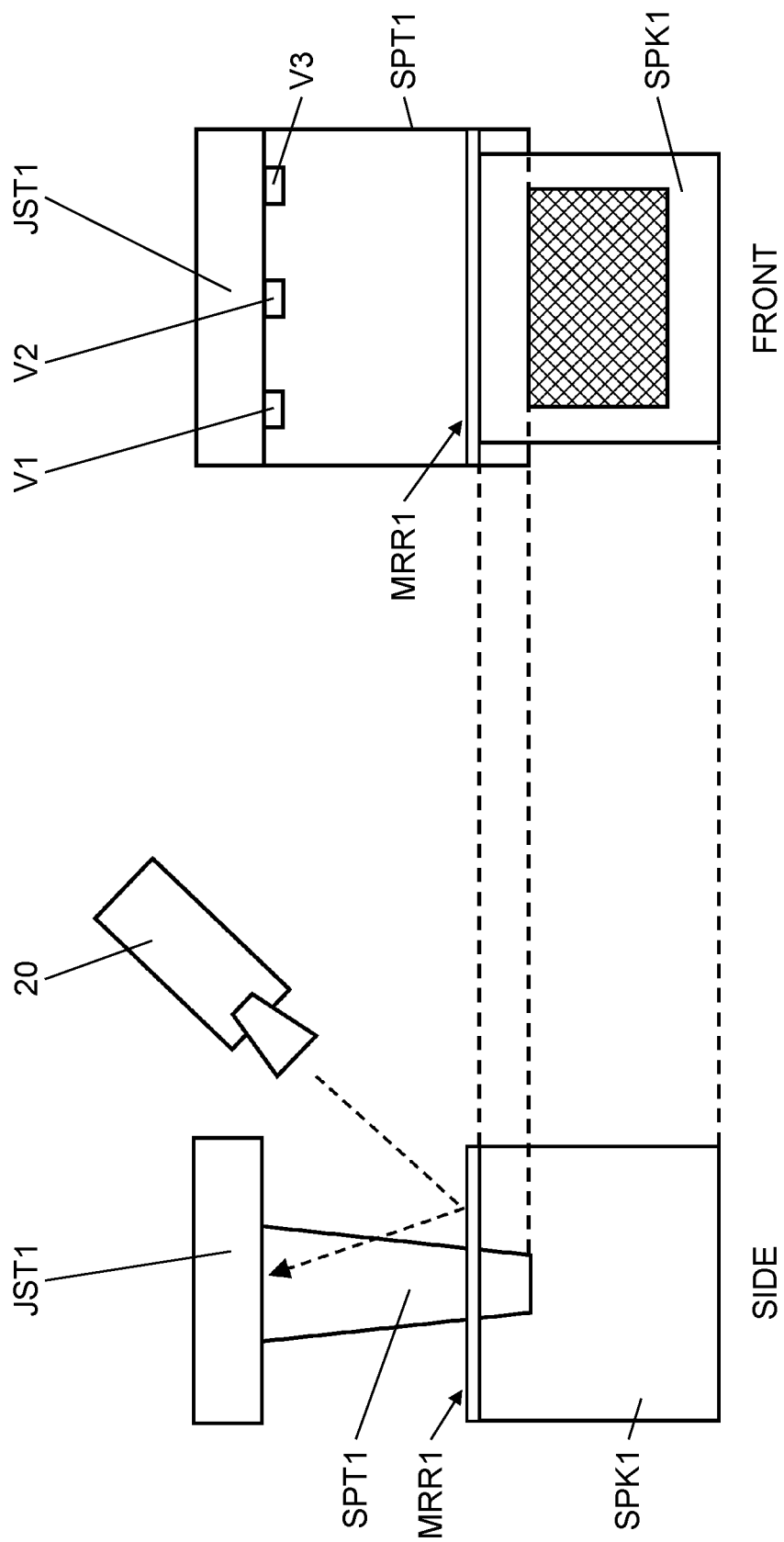
FIG. 3 is a scene diagram showing, in front view and side view, how each private speaker is fixed.

(speaker fastening fitting). FIG. 3 is a scene diagram showing, in front view and side view, how private speaker SPK1 is fixed.

As shown in FIG. 1, down train TR1 and up train TR2 pass through the platform of station STA. For the sake of clarity of the following description, station STA shown in FIG. 1 is a station where only ordinary type (local) trains stop. Private speakers SPK1, SPK2 for outputting an announcement to passengers and the like are each hung from and fixed to the ceiling of the platform. Further, visible light camera 10 is hung from the ceiling of the platform to include train TR1 within an angle of view so as to detect the passage of train TR1 or monitor passengers on the platform. Although not shown in FIG. 1, a visible light camera is hung from the ceiling of the platform to include train TR2 within an angle of view so as to detect the passage of train TR2 or monitor passengers on the platform.

As shown in FIG. 2, private speaker SPK1 is hung from and fixed to beam JST1 of the ceiling of the platform via support fitting SPT1 fastened with three bolts V1, V2, V3. In other words, each of three bolts V1 to V3 is used to fasten support fitting SPT1 of private speaker SPK1 to beam JST1, in a screwed manner. However, when a train (for example, train TR1) passes through the platform of station STA, vibrations occur at each timing, the vibrations being different in amplitude (magnitude) in a manner that depends on the type (for example, not-in-service, express, limited express) of the passing train or a number of passing trains. This generates, in support fitting SPT1 (an example of the structure) that supports private speaker SPK1, stresses in proportion to the magnitude of the vibrations. For the sake of clarity of the description, when passing through the platform of station STA, the express train and the limited express train are different in speed from each other, and the latter is faster than the former. In other words, the passage of the limited express train applies large stresses to support fitting SPT1 as compared with the passage of the express train.

Under the stress properties measurement method according to the first exemplary embodiment, stress properties measurement system 100 generates a thermal image of the surface of the structure using infrared camera 20 for measurement of stress properties of the structure (for example, support fitting SPT1) affected by vibrations that vary in magnitude in a manner that depends on a situation when a train passes through the platform of station STA (see FIG. 3). For example, as shown in side view and front view in FIG. 3, mirror MRR1 is disposed on an upper surface of a housing of private speaker SPK1. Infrared camera 20 takes (captures) a mirror image of the structure reflected on mirror MRR1 (specifically, a mirror image of support fitting SPT1 fixed to beam JST1 with three bolts V1 to V3) to generate the thermal image of the structure (for example, support fitting SPT1 including three bolts V1 through V3).

<Structure of Stress Properties Measurement System>

Figure 4:
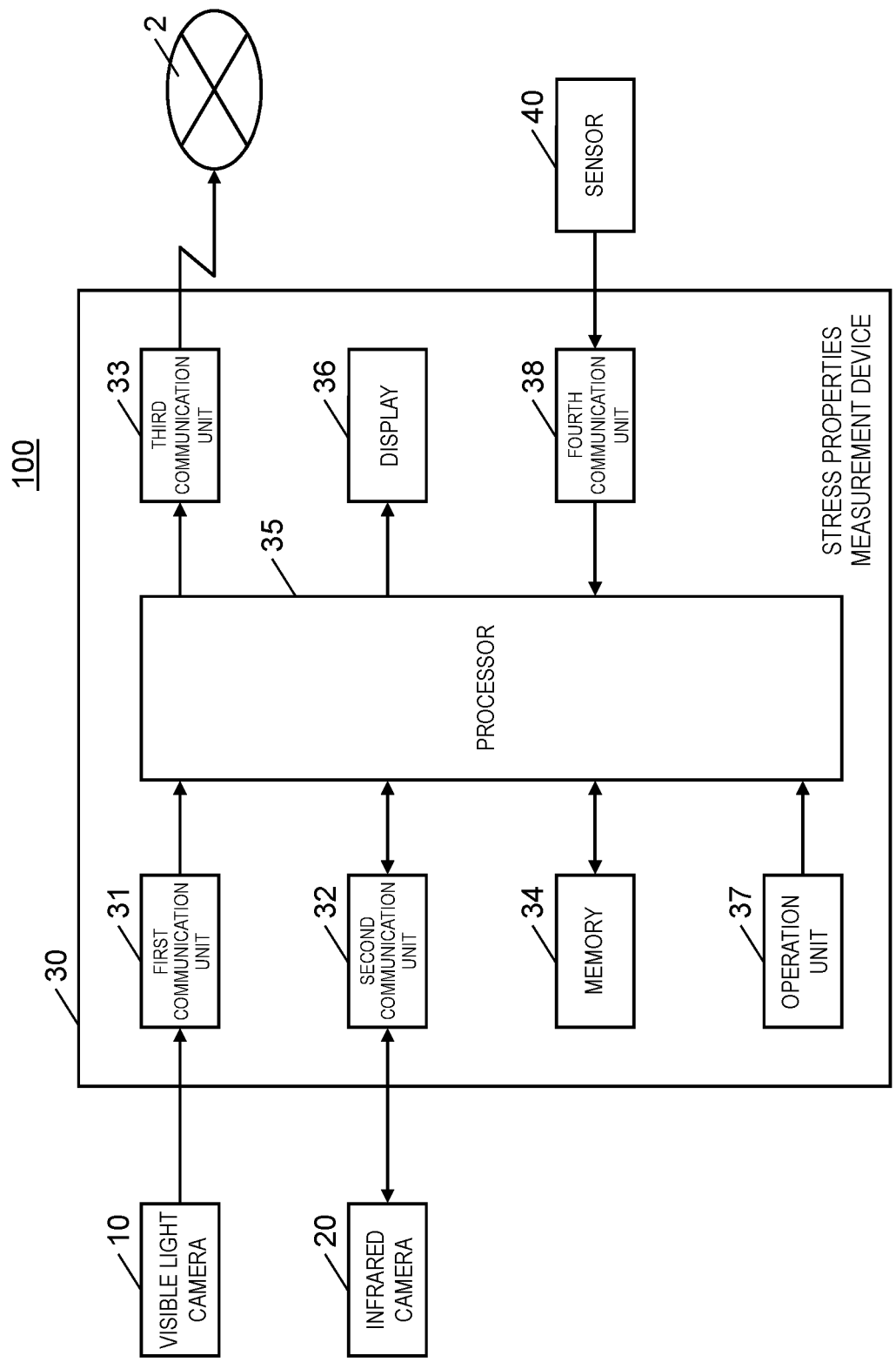
FIG. 4 is a block diagram showing an example of a structure of a stress properties measurement system according to a first exemplary embodiment.

FIG. 4 is a block diagram showing an example of a structure of stress properties measurement system 100 according to the first exemplary embodiment. For example, when a train passes through the platform of station STA, stress properties measurement system 100 measures properties of stresses generated in support fitting SPT1 (an example of the structure) that supports the private speaker hung from the ceiling of the platform in proportion to the magnitude (amplitude) of vibrations that occur under each passage condition. Stress properties measurement system 100 includes visible light camera 10, infrared camera 20, and stress properties measurement device 30.

Visible light camera 10 as an example of the second imaging device is disposed while being hung from the ceiling of the platform of station STA, for example (see FIG. 1). Visible light camera 10 captures images at a predetermined frame rate (for example, 60 fps) with an angle of view fixed at the time of installation (for example, an angle of view covering train TR1 or passengers avoiding train TR1) to generate data of a visible image of a subject, and sends the data to stress properties measurement device 30.

Infrared camera 20 as an example of the first imaging device is disposed while being hung from the ceiling of the platform of station STA, for example (see FIG. 3). Infrared camera 20 captures images at a predetermined frame rate (for example, 60 fps) with an angle of view fixed at the time of installation (for example, an angle of view that allows an image of support fitting SPT1 including three bolts V1 to V3 as a subject to be captured, see FIG. 3) to generate data of a thermal image of the subject, and sends the data to stress properties measurement device 30.

Stress properties measurement device 30 specifies an imaging period from the start to end of the capturing of the thermal image of the structure (for example, support fitting SPT1 including three bolts V1 to V3) based on the data of the visible image from visible light camera 10 or data of a result of sensing from sensor 40. Further, the stress distribution and stress properties generated in the structure (support fitting SPT1 including three bolts V1 to V3) are measured based on the data of the thermal image of the subject captured during the imaging period. Stress properties measurement device 30 sends respective pieces of data of the stress distribution and stress properties to a server (not shown) or the like over Internet 2.

Sensor 40 is disposed while being hung from the ceiling of the platform of station STA, for example (not shown). Sensor 40 senses, at predetermined intervals, whether train TR1 has arrived at the platform based on the presence or absence of reflection of infrared rays emitted toward a predetermined area on the platform (for example, a position of train TR1 when train TR1 arrives at the platform) determined when sensor 40 is installed, generates data of the result of the sensing, and sends the data to stress properties measurement device 30.

A description will be given below of a structure of stress properties measurement device 30.

Stress properties measurement device 30 includes first communication unit 31, second communication unit 32, third communication unit 33, memory 34, processor 35, display 36, operation unit 37, and fourth communication unit 38.

First communication unit 31 is a communication interface such as universal serial bus (USB) or high-definition multimedia interface (HDMI) (registered trademark). First communication unit 31 serves as an input unit that receives, one after another, data of the visible images of the subject captured at the predetermined frame rate from visible light camera 10.

Second communication unit 32 is a communication interface such as USB or HDMI (registered trademark). Second communication unit 32 serves as an input unit that receives, one after another, data of the thermal images of the subject captured at the predetermined frame rate from infrared camera 20. Further, second communication unit 32 receives control information on operations such as the start and stop of the image-capturing of infrared camera 20 from processor 35, and sends the control information thus received to infrared camera 20.

Third communication unit 33 is a wireless communication interface that complies with a communication standard such as Institute of Electrical and Electronics Engineers (IEEE) 802.11, third generation mobile communication system (3G), fourth generation mobile communication system (4G), or fifth generation mobile communication system (5G). Third communication unit 33 connects processor 35 and Internet 2.

Memory 34 includes, for example, a random access memory (RAM) and a read only memory (ROM), stores a program necessary for bringing stress properties measurement device 30 into operation, and temporarily stores data or information generated while stress properties measurement device 30 is in operation. The RAM is, for example, a work memory used while processor 35 is in operation. The ROM prestores, for example, a program for controlling processor 35.

Further, memory 34 may include a recording medium such as a hard disk drive (HDD) or a solid state drive (n SSD) in addition to the RAM and ROM described above as physical components. Memory 34 stores the data of the visible image of the subject captured by visible light camera 10 and received via first communication unit 31. Further, memory 34 stores the data of the thermal image of the subject captured by infrared camera 20 and received via second communication unit 32. Further, memory 34 stores a reference value input from operation unit 37 to be described later, the reference value being necessary for processor 35 to specify a timing at which infrared camera 20 starts or stops the capturing of the thermal image.

Further, memory 34 stores a risk level presentation table (not shown) showing a correspondence between stress properties (gradient, see FIG. 10) at a point (portion) in the structure derived by processor 35 and risk level information on the point (portion). This risk level presentation table is defined in advance as default design information before the practical use of stress properties measurement system 100. Further, memory 34 stores an improvement measure presentation table (not shown) showing a relationship between the risk level information and an improvement measure to be taken for the structure (for example, a technical solution such as maintenance or repair). This improvement measure presentation table is defined in advance as default design information before the practical use of stress properties measurement system 100, but the improvement measure presentation table may be updated as needed such as addition, modification, or deletion through operation on operation unit 37 made by the user.

Processor 35 includes, for example, a central processing unit (CPU), a digital signal processor (DSP), or a field programmable gate array (FPGA). Processor 35 acts as a controller of stress properties measurement device 30 and executes a process of controlling, in a centralized manner, the operation of each component of stress properties measurement device 30, a process of inputting and outputting data between the components of stress properties measurement device 30, a process of computing data, and a process of storing data. Processor 35 operates in accordance with the program stored in memory 34.

For example, processor 35 controls operations such as the start and stop of image-capturing made by infrared camera 20. Processor 35 specifies a timing at which infrared camera 20 starts or stops the capturing of the thermal image based on the data of the visible image from visible light camera 10 or the data of the result of the sensing from sensor 40. Processor 35 measures a distribution of stresses generated in the structure (for example, support fitting SPT1 including three bolts V1 to V3) based on the data of the thermal image captured by infrared camera 20 in accordance with the timing thus specified.

For example, a method for obtaining a stress distribution from the thermal image data is as follows.

(1) Upon receipt of the data of the thermal image sent from infrared camera 20, processor 35 obtains an amount of change in temperature over time for each pixel of the thermal image as an amount of change in temperature. For example, processor 35 obtains the amount of change in temperature by Fourier transforming the data of the thermal image.

(2) Processor 35 obtains the stress distribution based on the amount of change in temperature thus obtained. Specifically, processor 35 obtains an amount of change in stresses overtime for each pixel of the thermal image as an amount of change in stresses based on the amount of change in temperature. For example, processor 35 computes the amount of change in stresses $\Delta\delta$ from the amount of change in temperature $\Delta T$ by using an equation (1) representing a thermoelastic effect.

[Math. 1]

$$\Delta T = -KT\Delta\delta \quad (1)$$

In the equation (1), K represents a thermoelastic modulus and $K=\alpha/(\rho C p)$. T represents an absolute temperature of the structure (for example, support fitting SPT1 including three bolts V1 to V3). $\alpha$ represents a coefficient of linear expansion of the structure, $\rho$ represents a density of the structure, and Cp represents a specific heat under constant stresses. Processor 35 generates a stress distribution image by obtaining the stress distribution based on the amount of change in stresses for each pixel constituting the thermal image. Processor 35 is an example of a generator.

Further, processor 35 generates the stress properties of the structure (see FIG. 10) from the plurality of images of the stress distribution thus measured (specifically, a stress distribution image (see FIGS. 5 to 9) based the thermal image captured when each of the vibrations having different magnitudes (amplitudes) occurs. Processor 35 sends data of the image of the stress distribution in the structure or data of the stress properties of the structure measured when a corresponding type of vibrations occurs to an external server or the like over Internet 2.

Display 36 includes, for example, a liquid crystal display or an organic electroluminescence (EL) display, and displays the data of the image of the stress distribution or the data of the stress properties measured by processor 35 as, for example, color information or tone information.

Operation unit 37 includes, for example, a keyboard, a touch panel, a button, and the like. Operation unit 37 is operated by the user when the user sets the reference value necessary for detecting a timing at which infrared camera 20 starts or stops the capturing of the thermal image.

Fourth communication unit 38 is a wireless communication interface that complies with a communication standard such as IEEE802.11, third generation mobile communication system (3G), fourth generation mobile communication system (4G), or fifth generation mobile communication system (5G). Fourth communication unit 38 connects sensor 40 and processor 35.

Next, a description will be given of examples of data containing the image of the stress distribution and the stress properties generated by stress properties measurement device 30 according to the first exemplary embodiment with reference to FIGS. 5 to 10.

Figure 5:
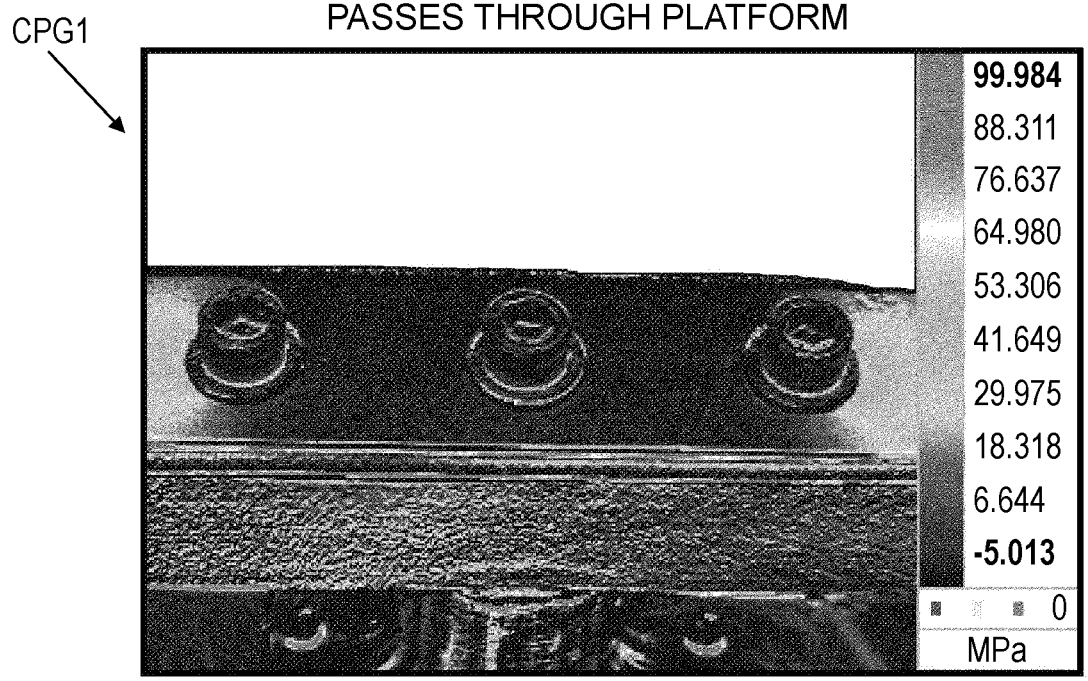
FIG. 5 is a diagram showing an example of a stress distribution in a joint between the beam and the support fitting when vibrations occur under a first condition.
Figure 6:
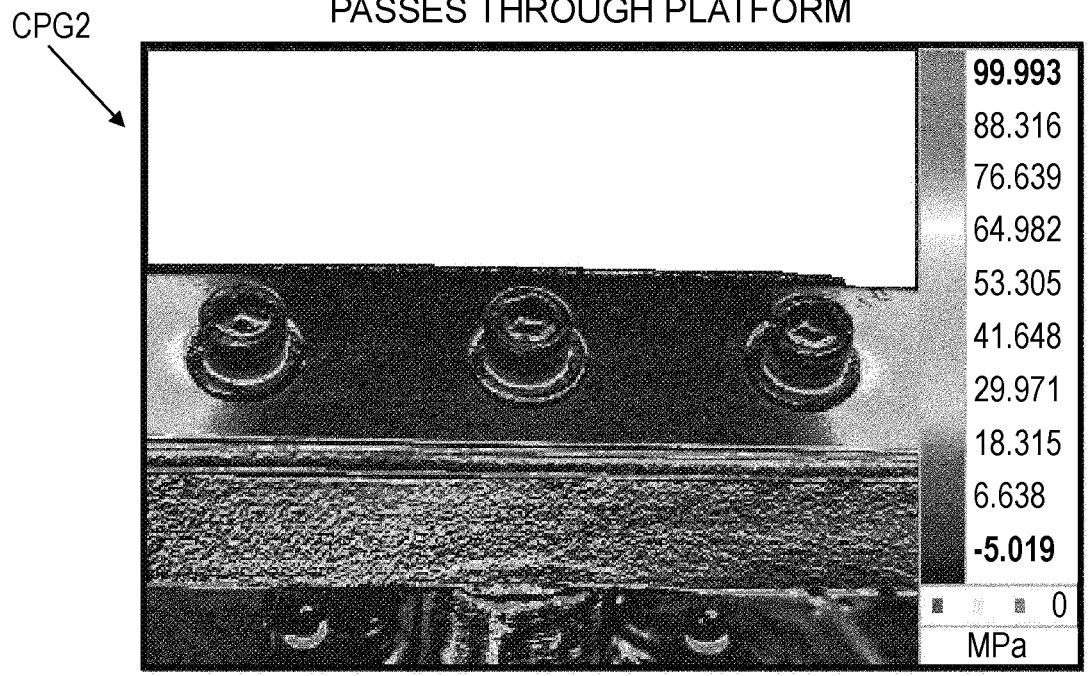
FIG. 6 is a diagram showing an example of a stress distribution in the joint between the beam and the support fitting when vibrations occur under a second condition.
Figure 7:
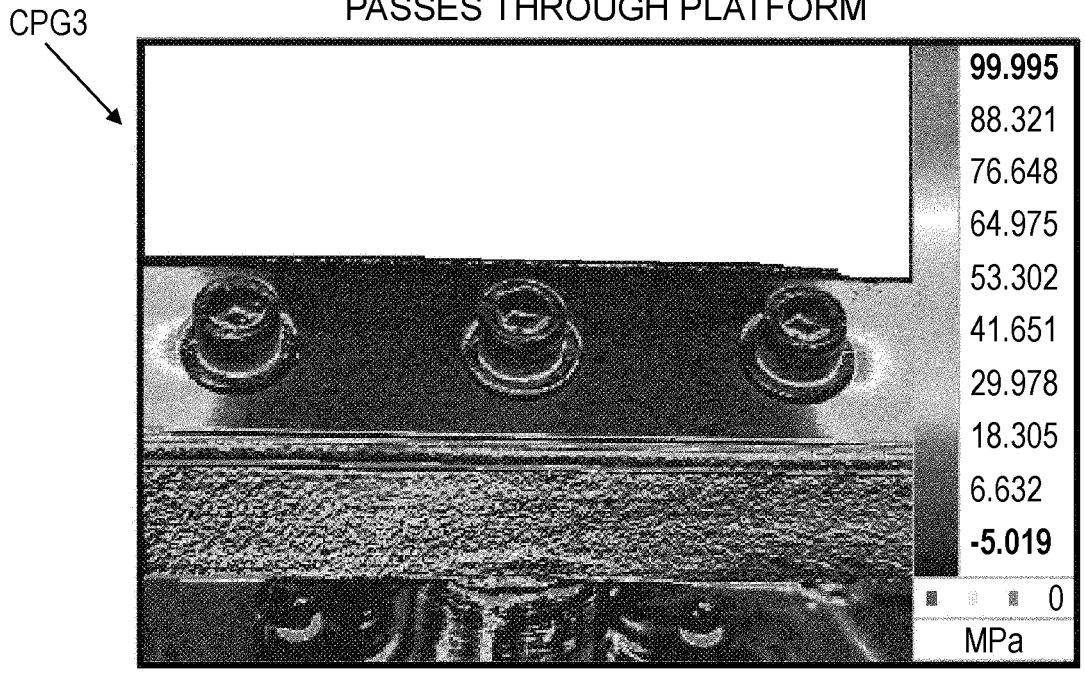
FIG. 7 is a diagram showing an example of a stress distribution in the joint between the beam and the support fitting when vibrations occur under a third condition.
Figure 8:
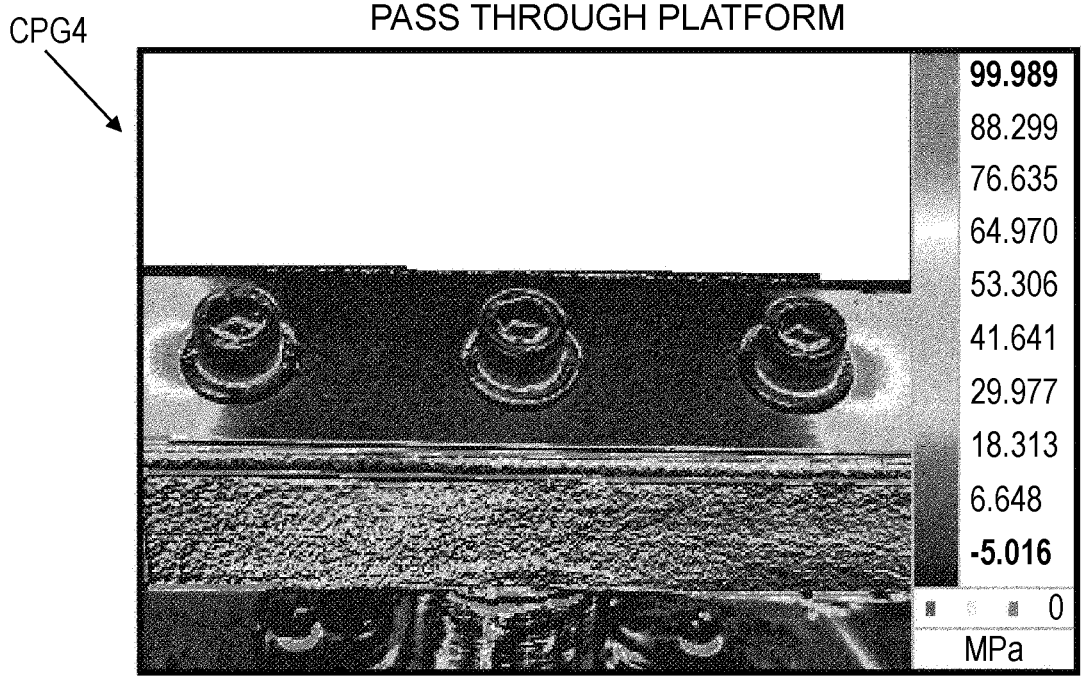
FIG. 8 is a diagram showing an example of a stress distribution in the joint between the beam and the support fitting when vibrations occur under a fourth condition.
Figure 9:
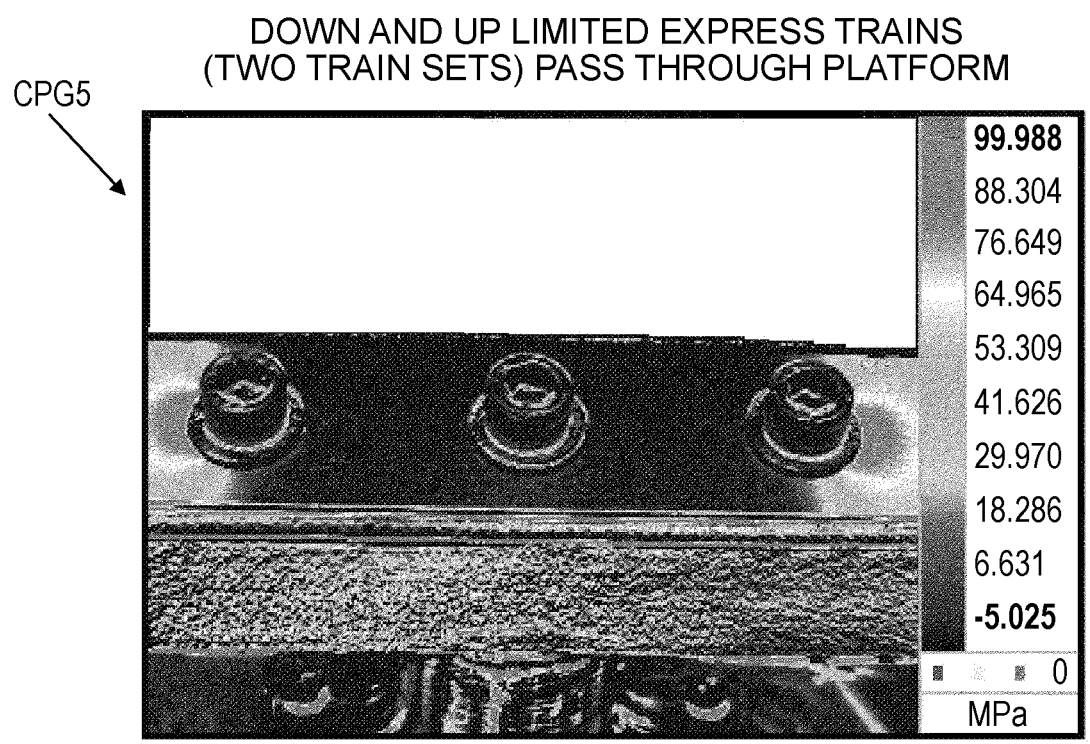
FIG. 9 is a diagram showing an example of a stress distribution in the joint between the beam and the support fitting when vibrations occur under a fifth condition.
Figure 10:
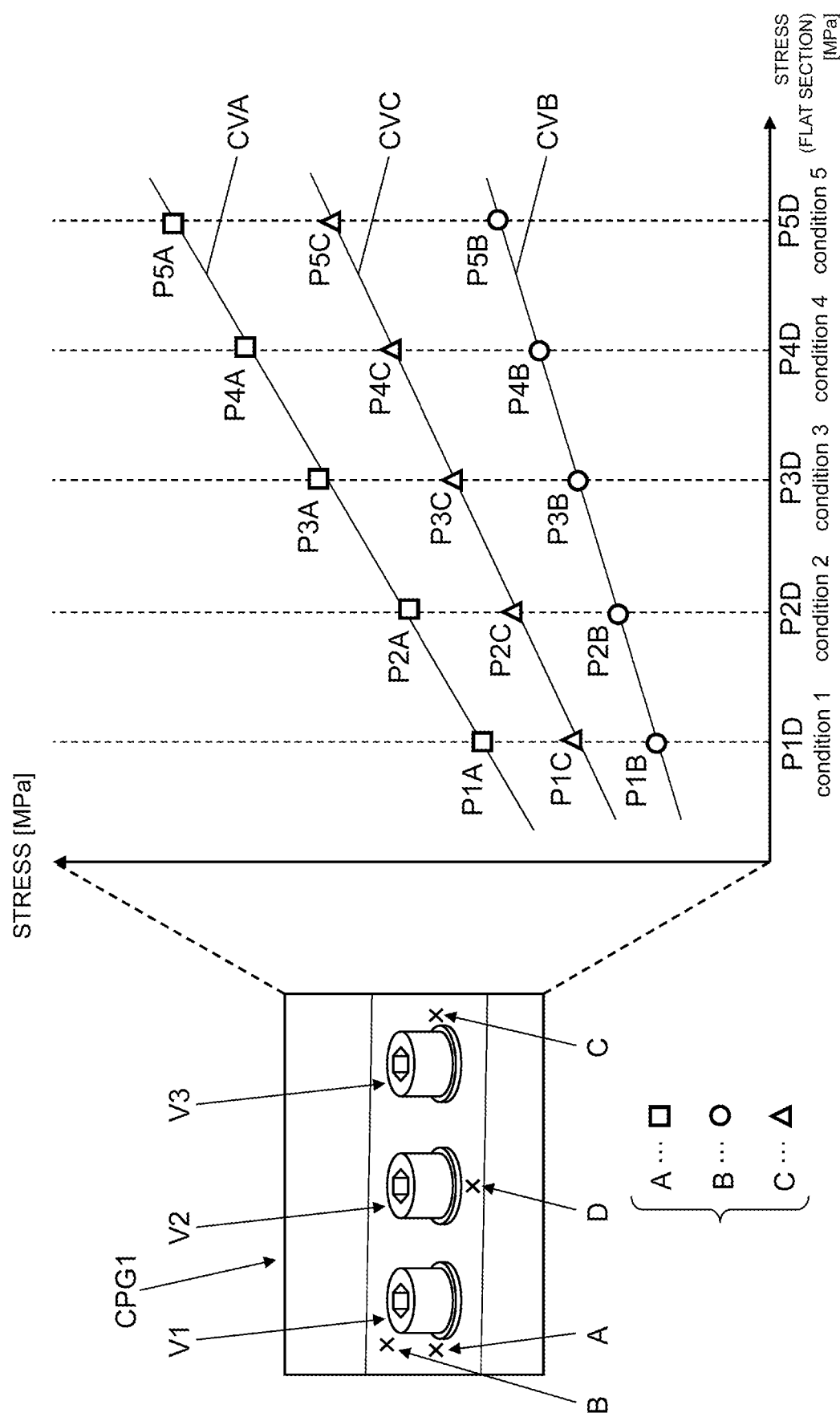
FIG. 10 is a diagram for describing respective examples of stress distribution properties at a plurality of positions in the joint between the beam and the support fitting.

FIG. 5 is a diagram showing an example of a stress distribution in the joint between beam JST1 and support fitting SPT1 when vibrations occur under a first condition. FIG. 6 is a diagram showing an example of a stress distribution in the joint between beam JST1 and support fitting SPT1 when vibrations occur under a second condition. FIG. 7 is a diagram showing an example of a stress distribution in the joint between beam JST1 and support fitting SPT1 when vibrations occur under a third condition. FIG. 8 is a diagram showing an example of a stress distribution in the joint between beam JST1 and support fitting SPT1 when vibrations occur under a fourth condition. FIG. 9 is a diagram showing an example of a stress distribution in the joint between beam JST1 and support fitting SPT1 when vibrations occur under a fifth condition. FIG. 10 is a diagram for describing respective examples of stress distribution properties at a plurality of positions in the joint between beam JST1 and support fitting SPT1.

As shown in FIG. 10, stress properties measurement device 30 according to the first exemplary embodiment derives, from the plurality of stress distribution images generated based on the thermal image captured when each of the plurality of vibrations having different magnitudes (amplitudes) occurs, stress values (pixel values) of four different points (specifically, points A, B, C, D) in the structure appearing in each image. According to the first exemplary embodiment, the first to fifth conditions are exemplified as the conditions under which the plurality of vibrations having different magnitudes (amplitudes) occur in the structure. Stress properties measurement device 30 derives, from data of the plurality of stress distribution images obtained when vibrations satisfying each of the vibration occurrence conditions of the first to fifth conditions occur, stress properties based on the respective stress values of points A, B, C, D under each vibration occurrence condition (see FIG. 10).

For example, as shown in FIG. 5, image CPG1 of the stress distribution is generated based on the thermal image of the joint (see above) captured by infrared camera 20 when vibrations occur under the first condition. Here, the vibrations under the first condition are the smallest in magnitude (amplitude) among the vibrations that occur in the structure (for example, support fitting SPT1 including three bolts V1 to V3) under the five conditions (the first to fifth conditions) exemplified according to the first exemplary embodiment. For example, the vibrations under the first condition continue to occur until train TR1 (train TR2) that is not in service passes through the platform of station STA in the down direction (or the up direction) shown in FIG. 1. Here, for the sake of clarity of the description, it is assumed that a speed at which a train passes through the platform of station STA increases in the order of the not-in-service train, the express train, and the limited express train. With reference to image CPG1 shown in FIG. 5, the stress value of point D (a first section, an example of a flat section) near bolt V2 located at the center among three bolts V1 to V3 becomes the smallest, and the respective stress values of points A, B, C (examples of a second section) near bolts V1, V3 located at both ends become the maximum (largest) as compared with the stress value of point D.

For example, as shown in FIG. 6, image CPG2 of the stress distribution is generated based on the thermal image of the joint (see above) captured by infrared camera 20 when vibrations occur under the second condition. Here, the vibrations under the second condition are the second smallest in magnitude (amplitude) among the vibrations that occur in the structure (for example, support fitting SPT1 including three bolts V1 to V3) under the five conditions (the first to fifth conditions) exemplified according to the first exemplary embodiment. For example, the vibrations under the second condition continue to occur until train TR1 (train TR2) that is an express train passes through the platform of station STA in the down direction (or the up direction) shown in FIG. 1. With reference to image CPG2 shown in FIG. 6, the stress value of point D (an example of the flat section) near bolt V2 located at the center among three bolts V1 to V3 becomes the smallest, and the respective stress values of points A, B, C near bolts V1, V3 located at both ends become the maximum (largest) as compared with the stress value of point D. Further, in image CPG2 shown in FIG. 6, the respective stress values of points A, B, C are greater than the respective stress values of points A, B, C in image CPG1 shown in FIG. 5.

For example, as shown in FIG. 7, image CPG3 of the stress distribution is generated based on the thermal image of the joint (see above) captured by infrared camera 20 when vibrations occur under the third condition. Here, the vibrations under the third condition are the third smallest in magnitude (amplitude) among the vibrations that occur in the structure (for example, support fitting SPT1 including three bolts V1 to V3) under the five conditions (the first to fifth conditions) exemplified according to the first exemplary embodiment. For example, the vibrations under the third condition continue to occur until train TR1 (train TR2) that is a limited express train passes through the platform of station STA in the down direction (or the up direction) shown in FIG. 1. With reference to image CPG3 shown in FIG. 7, the stress value of point D (an example of the flat section) near bolt V2 located at the center among three bolts V1 to V3 becomes the smallest, and the respective stress values of points A, B, C near bolts V1, V3 located at both ends become the maximum (largest) as compared with the stress value of point D. Further, in image CPG3 shown in FIG. 7, the respective stress values of points A, B, C are greater than the respective stress values of points A, B, C in image CPG2 shown in FIG. 6.

For example, as shown in FIG. 8, image CPG4 of the stress distribution is generated based on the thermal image of the joint (see above) captured by infrared camera 20 when vibrations occur under the fourth condition. Here, the vibrations under the fourth condition are the second largest in magnitude (amplitude) among the vibrations that occur in the structure (for example, support fitting SPT1 including three bolts V1 to V3) under the five conditions (the first to fifth conditions) exemplified according to the first exemplary embodiment. For example, the vibrations under the fourth condition continue to occur until trains TR1, TR2 that are express trains pass through the platform of station STA in the down and up directions shown in FIG. 1. With reference to image CPG4 shown in FIG. 8, the stress value of point D (an example of the flat section) near bolt V2 located at the center among three bolts V1 to V3 becomes the smallest, and, in particular, the respective stress values of points A, C among points A, B, C near bolts V1, V3 located at both ends become the maximum (largest) as compared with the stress value of point D. Further, in image CPG4 shown in FIG. 8, the respective stress values of points A, B, C are greater than the respective stress values of points A, B, C in image CPG3 shown in FIG. 7.

For example, as shown in FIG. 9, image CPG5 of the stress distribution is generated based on the thermal image of the joint (see above) captured by infrared camera 20 when vibrations occur under the fifth condition. Here, the vibrations under the fifth condition are the largest in magnitude (amplitude) among the vibrations that occur in the structure (for example, support fitting SPT1 including three bolts V1 to V3) under the five conditions (the first to fifth conditions) exemplified according to the first exemplary embodiment. For example, the vibrations under the fifth condition continue to occur until trains TR1, TR2 that are limited express trains pass through, at the same time or nearly the same time, the platform of station STA in the down and up directions shown in FIG. 1. With reference to image CPG5 shown in FIG. 9, the stress value of point D (an example of the flat section) near bolt V2 located at the center among three bolts V1 to V3 becomes the smallest, and, in particular, the respective stress values of points A, C among points A, B, C near bolts V1, V3 located at both ends become the maximum (largest) as compared with the stress value of point D. Further, in image CPG5 shown in FIG. 9, the respective stress values of points A, B, C are greater than the respective stress values of points A, B, C in image CPG4 shown in FIG. 8.

As described above, stress properties measurement device 30 according to the first exemplary embodiment derives, from data of the plurality of stress distribution images obtained when the vibrations shown in FIGS. 5 to 9 occur, stress properties based on the respective stress values of points A, B, C, D under each vibration occurrence condition (see FIG. 10). In FIG. 10, a horizontal axis of a stress properties graph represents stresses [MPa] at the flat section such as point D in the stress distribution image (for example, images CPG1 to CPG5). A vertical axis of the stress properties graph represents stresses [MPa] at a point such as points A, B, C where stresses tend to be concentrated in the stress distribution image (for example, images CPG1 to CPG5). Points A, B, C are points where support fitting SPT1 hung from beam JST1 supports the housing of private speaker SPK1, so that stresses tend to be concentrated at points A, B, C due to the occurrence of vibrations as compared with point D.

Stress properties measurement device 30 selects, based on the data of image CPG1 of the stress distribution when the vibrations occur under the first condition, a point (for example, point D) that is small (minimum) in stress gradient among the pixel values in the image and selects a plurality of (for example, three) points (for example, points A, B, C) that are large in stress gradient among the pixel values. Processor 35 is an example of a selector. Stress properties measurement device 30 plots a set of stress value P1D of point D corresponding to the occurrence of vibrations under the first condition and respective stress values P1A, P1B, P1C of points A, B, C corresponding to the occurrence of vibrations under the first condition on the stress properties graph.

Next, stress properties measurement device 30 selects, based on data of image CPG2 of the stress distribution when vibrations occur under the second condition, a set of stress values P2A, P2B, P2C, P2D of same points A, B, C, D as points A, B, C, D in the structure selected in the image of the stress distribution when vibrations occur under the first condition. Stress properties measurement device 30 plots stress values P2A, P2B, P2C, P2D thus selected on the stress properties graph.

Likewise, stress properties measurement device 30 selects, based on data of respective images CPG3 to 5 of the stress distribution when vibrations occur under the third to fifth conditions, a set of stress values (P3A, P3B, P3C, P3D), a set of stress values (P4A, P4B, P4C, P4D), and a set of stress values (P5A, P5B, P5C, P5D) of same points A, B, C, D as points A, B, C, D in the structure selected in the image of the stress distribution when vibrations occur under the first condition. Stress properties measurement device 30 plots the set of stress values (P3A, P3B, P3C, P3D), the set of stress values (P4A, P4B, P4C, P4D), and the set of stress values (P5A, P5B, P5C, P5D) thus selected on the stress properties graph.

Stress properties measurement device 30 computes a correlation (gradient) between the magnitude (amplitude) of vibrations and the stress value of points A, B, C other than point D that is the flat section in the structure (in other words, a point where the amount of change in stress gradient is small even when the magnitude (amplitude) of vibrations changes). Specifically, stress properties measurement device 30 derives the properties of the stress value based on the magnitude (amplitude) of the vibrations at point A as, for example, a gradient that results from fitting straight line CVA of the linear function. Similarly, stress properties measurement device 30 derives the properties of the stress value based on the magnitude (amplitude) of the vibrations at each of points B, C as, for example, a gradient that results from fitting a corresponding one of straight lines CVB, CVC of the linear function. Accordingly, stress properties measurement device 30 can quantitatively derive, by using a plurality of stress distribution images obtained when a plurality of vibrations having different magnitudes (amplitudes) are applied to the structure at different timings, properties of stresses applied to a portion in the structure where stresses tend to be concentrated based on the magnitude (amplitude) of the vibrations.

<Operation of Stress Properties Measurement System>

Figure 11:
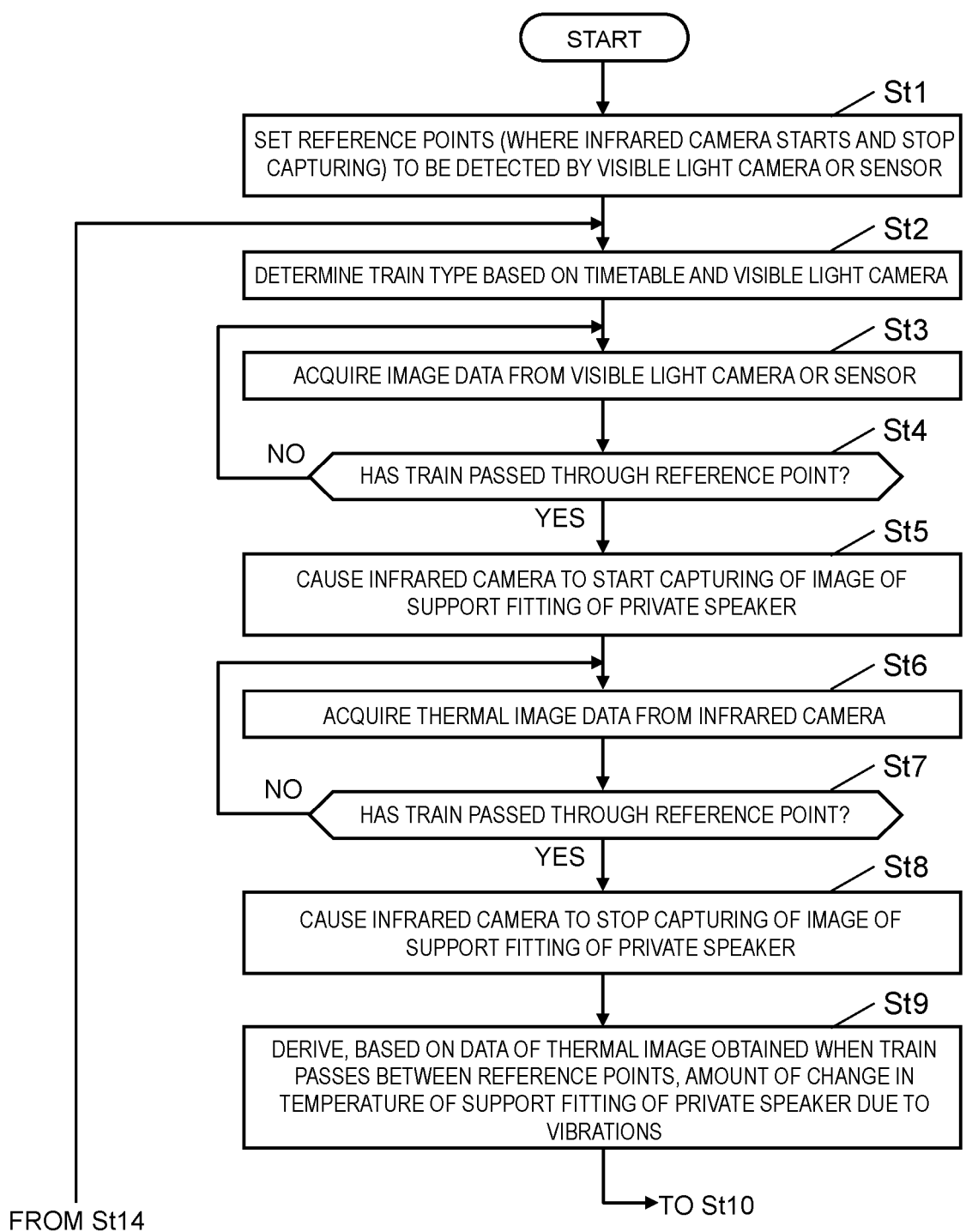
FIG. 11 is a flowchart showing an operation procedure of a stress properties measurement device according to the first exemplary embodiment.
Figure 12:
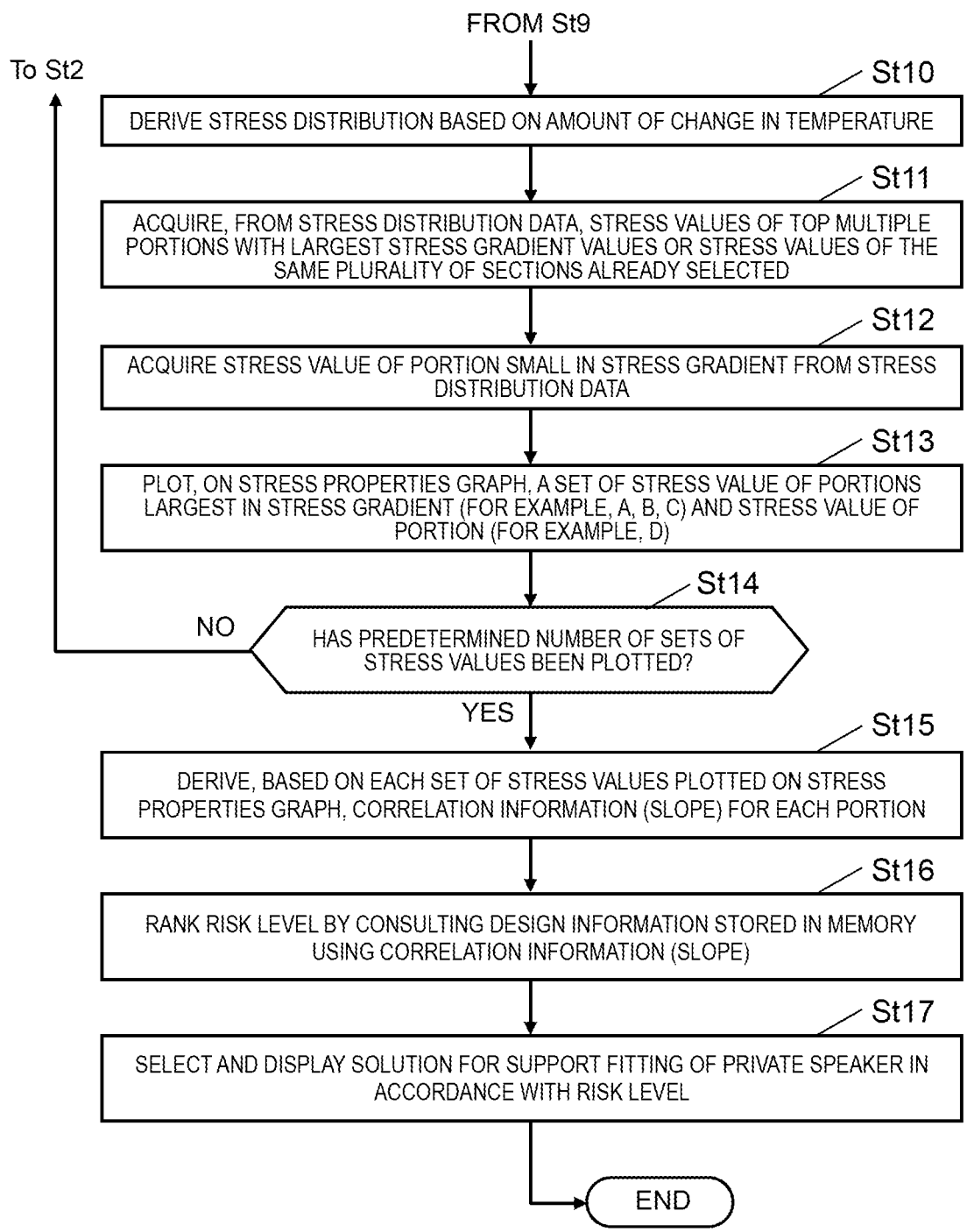
FIG. 12 is a flowchart showing the operation procedure of the stress properties measurement device according to the first exemplary embodiment.

Next, a description will be given of an operation procedure of stress properties measurement system 100 according to the first exemplary embodiment with reference to FIGS. 11 and 12. FIGS. 11 and 12 are flowcharts showing the operation procedure of stress properties measurement device 30 according to the first exemplary embodiment. In FIGS. 11 and 12, processor 35 of stress properties measurement device 30 primarily executes processes of various kinds.

In FIG. 11, as an initial setting, the position of the reference point (that is, the reference value) to be detected based on the image captured by visible light camera 10 or the data of the result of the sensing from sensor 40 is set through the operation made by the user on operation unit 37 (St1).

Here, the position of the reference point may include a position on the platform when infrared camera 20 starts the capturing of the thermal image and a position on the platform when infrared camera 20 stops the capturing of the thermal image. The position on the platform when the capturing of the thermal image is started is a position at an end (for example, the right end or the left end) of the angle of view of visible light camera 10 or of the sensing area of sensor 40 and where, for example, a leading vehicle of the train appears first in the angle of view or in the sensing area. On the other hand, the position on the platform when the capturing of the thermal image is stopped is a position at an end (for example, the left end or the right end) of the angle of view of visible light camera 10 or of the sensing area of sensor 40 and where, for example, a last vehicle of the train appears last in the angle of view or in the sensing area.

Stress properties measurement device 30 determines the type of a train that is likely to appear in the captured image based on, for example, a timetable of station STA stored in memory 34 and the captured image from visible light camera 10 (St2). Stress properties measurement device 30 acquires the data of the captured image from visible light camera 10 or the data of the result of the sensing from sensor 40 (St3).

Stress properties measurement device 30 determines, based on the result of the determination in step St2, whether a train appearing in the captured image acquired in step St3 is of a type that passes through station STA and has passed through a first reference point set in step St1 (St4). Here, the first reference point in step St4 is a reference point where infrared camera 20 starts the capturing of the thermal image. When the train appearing in the captured image is not of a type that passes through station STA, or when the train appearing in the captured image is of a type that passes through station STA but has not yet passed through the first reference point (NO in St4), the process in stress properties measurement device 30 is put into a standby and waits until the train, appearing in the captured image, of a type that passes through station STA passes through the first reference point set in step St1.

On the other hand, when determining that the train appearing in the captured image is of a type that passes through station STA and has passed through the first reference point set in step St1 (YES in St4), stress properties measurement device 30 instructs infrared camera 20 to start the capturing the thermal image of the structure (St5). Stress properties measurement device 30 acquires the data of the thermal image sent from infrared camera 20 based on the instruction in step St5 (St6).

Stress properties measurement device 30 determines whether the train that has passed through the first reference point in step St4 has passed through a second reference point set in step St1 (St7). Here, the second reference point in step St7 is a reference point where infrared camera 20 stops the capturing of the thermal image. When the train that has passed through the first reference point has not yet passed through the second reference point (NO in St7), the process in stress properties measurement device 30 is put into a standby and waits until the train appearing in the captured image passes through the second reference point set in step St1.

On the other hand, when determining that the train appearing in the captured image has passed through the second reference point set in step St1 (YES in St7), stress properties measurement device 30 instructs infrared camera 20 to stop the capturing the thermal image of the structure (St8). Stress properties measurement device 30 acquires the data of the thermal image sent from infrared camera 20 in accordance with the instruction in step St5 (St9). Further, stress properties measurement device 30 derives, based on the data of the thermal image thus acquired, the amount of change in temperature due to the occurrence of vibrations in the structure as the train passes (St9).

In FIG. 12, stress properties measurement device 30 obtains the stress distribution based on the amount of change in temperature for each pixel derived in step St9 to generate an image of the stress distribution having a stress value as a pixel value for each pixel (St10). Stress properties measurement device 30 selects and acquires stress values of a plurality of (for example, three) points (for example, points A, B, C) that are the largest in stress gradient among the pixel values from the data of the image of the stress distribution obtained in step St10 (St11). Alternatively, stress properties measurement device 30 selects and acquires the stress values of the same points as the plurality of points that are the largest in stress gradient and previously selected (St11).

Stress properties measurement device 30 selects and acquires a stress value of a point (for example, point D) that is small (minimum) in stress gradient among the pixel values in the image from the data of the image of the stress distribution obtained in step St10 (St12). Stress properties measurement device 30 plots, on the stress properties graph (see FIG. 10), a set of the stress values of the plurality of points that are the largest in stress gradient and where stresses tend to be concentrated and the stress value of the point that is small in stress gradient obtained in steps St11, St12 (St13).

Stress properties measurement device 30 determines whether a predetermined number or more of sets of stress values have been plotted on the stress properties graph in step St13 (St14). When the predetermined number or more of sets of stress values have not yet been plotted on the stress properties graph (NO in St14), the process in stress properties measurement device 30 returns to step St2, and the process from step St2 to step St14 is repeated in stress properties measurement device 30 until the predetermined number or more of sets of stress values are plotted on the stress properties graph.

On the other hand, when determining in step St13 that the predetermined number or more of stress values have been plotted on the stress properties graph (YES in St14), stress properties measurement device 30 derives correlation properties (specifically, the gradient of a straight line) for each point (portion) from the data of the set of stress values of each point plotted on the stress properties graph (St15).

Further, when detecting that any straight line (for example, the straight line CVA) in the stress properties graph has been selected through the operation made by the user, stress properties measurement device 30 specifies, based on information on the gradient derived in step St15 and the risk level presentation table (see above) stored in memory 34, a risk level at a point (portion) in the structure corresponding to the gradient of the straight line thus selected. Stress properties measurement device 30 ranks the risk level in one of a predetermined number of ranks and displays the result on display 36 (St16).

Further, stress properties measurement device 30 uses information on the risk level specified in step St16 and the improvement measure presentation table (see above) stored in memory 34 to display, on display 36, an improvement measure (solution) for the point (portion) in the structure corresponding to the risk level (St17).

As described above, in stress properties measurement system 100 according to the first exemplary embodiment, stress properties measurement device 30 measures the properties of stresses generated in the structure (for example, support fitting SPT1 including three bolts V1 to V3). Stress properties measurement device 30 includes second communication unit 32 that acquires, from infrared camera 20, a plurality of thermal images different in imaging time from each other, the plurality of thermal images corresponding to temperatures of a surface of the structure, and processor 35 that generates the stress distribution image corresponding to each of the plurality of thermal images. Processor 35 acquires, in the stress distribution image, the stress value of point D (first section) that is smaller in stress gradient than a predetermined value and the respective stress values of points A, B, C (the plurality of second sections) where stresses are concentrated, derives, from the stress value of point D and the respective stress values of points A, B, C thus acquired, correlation properties of stresses at a section of the structure (for example, at least one of points A, B, C), and outputs the correlation properties.

Accordingly, for example, even under an actual field environment (for example, the ceiling of the platform of station STA) where the structure such as support fitting SPT1 that supports private speaker SPK1 is disposed, stress properties measurement device 30 can easily measure, based on the thermal image from infrared camera 20, stresses applied to the structure due to vibrations generated each time the train passes through the platform. Further, stress properties measurement device 30 can easily and conveniently obtain, from the thermal image captured by infrared camera 20, the stress distribution even in a narrow and small structure that is too small in area for a strain gauge to be attached unlike stress measurement using a strain gauge in the related art. Further, in order to support a comparison of stresses at each portion of the structure, stress properties measurement device 30 can obtain a plurality of stress distributions corresponding to a plurality of types of vibrations having different magnitudes (amplitudes) applied to the structure, and measure, with high accuracy and convenience, stress correlation properties using the stress value of the portion in the structure where stresses tend to be concentrated and the stress value of the flat section in the structure that is small in stress gradient. When the correlation properties can be grasped, stress properties measurement device 30 allows the user to easily determine which portion in the structure where stresses tend to be concentrated is subject to strong stresses and which portion tends to be shortened in life as properties of the structure.

Further, in stress properties measurement system 100, visible light camera 10 or sensor 40 detects the occurrence of vibrations (in other words, an event that generates vibrations) generated at the place where the structure is disposed (for example, the ceiling of the platform of station STA). This event corresponds to, for example, the passage of a train through the platform of station STA. Infrared camera 20 captures and generates the thermal image in accordance with an instruction from stress properties measurement device 30 each time the occurrence of vibrations is detected at the place where the structure is disposed. Accordingly, stress properties measurement device 30 can generate an image of the stress distribution applied to the structure at a timing necessary for obtaining highly accurate correlation properties of the stresses at each portion of the structure.

Further, in stress properties measurement system 100, when the detection is performed at least three times to detect occurrences of vibrations having different amplitudes, stress properties measurement device 30 derives the correlation properties based on the stress value of point D and the respective stress values of points A, B, C where stresses tend to be concentrated, selected for the stress distribution image generated in response to the detection of each of the occurrences of vibrations. Accordingly, stress properties measurement device 30 can fit, with higher accuracy, a linear function or the like based on the plots of the set of the stress value of point D and the respective stress values of points A, B, C where stresses tend to be concentrated, selected for the stress distribution image, so that highly accurate correlation properties can be derived.

Further, in stress properties measurement system 100, in order to acquire the stress values of points A, B, C, stress properties measurement device 30 acquires the stress values of the same sections among the plurality of portions where stresses are concentrated for each of the plurality of stress distribution images. Accordingly, stress properties measurement device 30 can easily compare the degree of change in stresses at the same portion received in response to vibrations in the structure, and thus can help the user determine whether the presence or absence of deterioration over time at the same portion.

Further, in stress properties measurement system 100, stress properties measurement device 30 determines the state of the structure based on the result of deriving the correlation properties (for example, the gradient of the straight line of the linear function used for fitting). Accordingly, the user can easily determine whether there is a high-risk portion in the structure where stresses tend to be concentrated.

Further, in stress properties measurement system 100, stress properties measurement device 30 presents a measure to be taken for the structure based on the result of determining the state of the structure. Accordingly, the user can easily determine whether to apply a technical measure (for example, repair) to the portion in the structure where stresses tend to be concentrated.

Although various exemplary embodiments have been described above with reference to the drawings, it goes without saying that the present disclosure is not limited to such examples. It is obvious that those skilled in the art can come up with various modification examples, correction examples, replacement examples, addition examples, deletion examples, and equivalent examples within the scope of the claims, and it should be understood that such examples fall within the technical scope of the present disclosure as a matter of course. Further, the components according to the various exemplary embodiments described above may be combined as needed without departing from the gist of the present invention.

According to the above-described first exemplary embodiment, support fitting SPT1 (see FIG. 1) of private speaker SPK1 disposed while being hung from the ceiling of the platform of station STA is given as an example of the structure, but the structure is not limited to support fitting SPT1. For example, the structure may be a train body. The train body is subject to vibrations while traveling, and a number of passengers may differ in a manner that depends on a time period such as a commuting time, or passengers may be unevenly concentrated in a specific car (car number). It is therefore highly advantageous that the correlation properties for each portion of the train body can be obtained from an image of the stress distribution applied to the train body.

Further, the structure may be a heavy machine such as a crane. The heavy machine such as a crane is subject to vibrations while traveling, and stresses received by a tip arm may differ in a manner that depends on a weight of a load such as soil to be carried. It is therefore highly advantageous that the correlation properties for each portion of the tip arm can be obtained from an image of the stress distribution applied to the tip arm of the heavy machine such as a crane.

Further, the structure may be a bridge provided between piers supporting a highway. The bridge is subject to vibrations by vehicles traveling on the bridge (standard-sized vehicles, trucks, and the like), and stresses received may differ in a manner that depends on a weight of each vehicle traveling on the bridge. It is therefore highly advantageous that the correlation properties for each portion of the bridge can be obtained from an image of the stress distribution applied to the bridge.

Further, the structure is not limited to a fastening portion such as bolts V1 to V3 for use in fastening support fitting SPT1 to beam JST1, in a screwed manner, and the structure may be, for example, a fastening portion formed by welding or a fastening portion formed by adhesion rather than bolts V1 to V3. This is because even the fastening portion formed by either welding or adhesion is subject to vibrations when a train passes, as in bolts V1 to V3 according to the first exemplary embodiment and is in turn subject to stresses as well.

Further, the description has been given, according to the first exemplary embodiment, of the example where a load due to an external load applied to the structure is not constant (in other words, vibrations are not constant in magnitude (amplitude)), but the load may be constant, and the magnitude (amplitude) of the vibrations may be unknown. That is, even when the load due to the external load is constant and unknown, stress properties measurement device 30 according to the first exemplary embodiment can measure (evaluate) the stress properties in the same manner.

The present disclosure is useful as the stress properties measurement method, the stress properties measurement device, and the stress properties measurement system, each of which being intended to measure, with high accuracy and convenience, stress properties for use in comparing stresses generated at each portion of a structure in an actual field environment where the structure is disposed.

What is claimed is:

1. A stress properties measurement method for measuring properties of stresses generated in a structure, the stress properties measurement method comprising:
   (i) applying a first stress to the structure;
   (ii) acquiring, from a first imaging device, a plurality of thermal images corresponding to temperatures of a surface of the structure caused by the first stress, the plurality of thermal images being different in imaging time from each other;
   (iii) generating a stress distribution image of the structure from the plurality of thermal images;
   (iv) finding a first section with a stress gradient smaller than a predetermined value and a plurality of second sections with largest stress gradients, in the stress distribution image;
   (v) acquiring a smallest stress value of the first section and a largest stress value of each of the plurality of second sections;
   (vi) repeating (i), (ii), (iii) and (v) with applying a second stress different than the first stress to the structure, and organizing sets of data of the smallest stress value of the first section produced by the first stress and the second stress and the largest stress value of each of the plurality of second sections produced by the first stress and the second stress;
   (vii) deriving correlation properties of stresses based on the sets of data;
   (viii) determining a state of the structure based on the derived correlation properties; and
   (ix) applying a technical measure, including at least one of maintenance and repair, to the structure based on the state of the structure.

2. The stress properties measurement method according to claim 1 further comprising detecting, by a second imaging device or a sensor, an occurrence of vibrations that causes the first stress at a place where the structure is disposed,
   wherein in the generating the plurality of thermal images, the plurality of thermal images are generated each time the occurrence of vibrations at the place where the structure is disposed is detected.

3. The stress properties measurement method according to claim 2, wherein in the deriving of the correlation properties, when the detecting is performed at least three times to detect occurrences of vibrations having different amplitudes, the correlation properties are derived based on the smallest stress value of the first section and the respective largest stress values of the plurality of second sections selected from the stress distribution image generated in response to the detecting of each of the occurrences of vibrations.

4. The stress properties measurement method according to claim 1, wherein in (v), in the stress distribution image, the plurality of second sections are identical in location to each other.

5. The stress properties measurement method according to claim 1, further comprising presenting a measure to be taken for the structure based on a result of the determining of the state of the structure.

6. A stress properties measurement device that measures properties of stresses generated in a structure, the stress properties measurement device comprising: a processor programmed, with instructions stored in a tangible, non-transitory computer readable medium, to perform:
   (i) acquiring acquires, from a first imaging device, a plurality of thermal images corresponding to temperatures of a surface of the structure to which a first stress is applied, the plurality of thermal images being different in imaging time from each other;
   (ii) generating a stress distribution image of the structure from the plurality of thermal images;
   (iii) finding a first section with a stress gradient smaller than a predetermined value and a plurality of second sections with largest stress gradients, in the stress distribution image;
   (iv) acquiring a smallest stress value of the first section and a largest stress value of each of the plurality of second sections;
   (v) repeating (i), (ii) and (iv) for the plurality of thermal images generated with applying a second stress different than the first stress to the structure, and organizing sets of data of the smallest stress value of the first region produced by the first stress and the second stress and the largest stress value of each of the plurality of second regions produced by the first stress and the second stress;
   (vi) deriving correlation properties of stresses based on the sets of data;
   (vii) determining a state of the structure based on the derived correlation properties; and
   (viii) applying a technical measure, including at least one of maintenance and repair, to the structure based on the state of the structure.

7. A stress properties measurement method for measuring properties of stresses generated in a structure, the stress properties measurement method comprising:
   acquiring, from an imaging device, a plurality of thermal images corresponding to temperatures of a surface of the structure, the plurality of thermal images being different in imaging time from each other under different stress conditions to the structure;
   generating a plurality of stress distribution images of the structure corresponding to each of the plurality of thermal images;
   finding a first section with a stress gradient smaller than a predetermined value and a plurality of second sections with largest stress gradients, in one of the stress distribution images;
   acquiring a smallest stress value of the first section and a largest stress value of each of the plurality of second sections from each of the plurality of thermal images, and organizing sets of data of the smallest stress value of the first section produced with the different stress conditions and the largest stress value of each of the plurality of second sections produced with the different stress conditions;

deriving correlation properties of stresses based on the sets of data;

determining a state of the structure based on the derived correlation properties; and applying a technical measure, including at least one of maintenance and repair, to the structure based on the state of the structure.

* * * * *